United States Patent [19]
Maeda

[11] Patent Number: 6,041,898
[45] Date of Patent: Mar. 28, 2000

[54] METHOD OF AND DEVICE FOR COOLING BRAKE FLUID

[76] Inventor: Hiroyuki Maeda, 49-7-608, Naritahigashi 1-chome, Suginami-ku,Tokyo 166, Japan

[21] Appl. No.: 09/283,700

[22] Filed: Apr. 1, 1999

Related U.S. Application Data

[62] Division of application No. 08/521,057, Aug. 29, 1995, Pat. No. 5,954,166.

[30]     Foreign Application Priority Data

Sep. 26, 1994 [JP] Japan .................................. 6-256289
Feb. 20, 1995 [JP] Japan .................................. 7-54989

[51] Int. Cl.$^7$ .............................. F16D 65/78; B60T 8/40
[52] U.S. Cl. ................................. 188/264 P; 188/264 F
[58] Field of Search ........................ 188/264 F, 71.6, 188/72.4, 106 F, 151 R, 152, 355, 358, 359, 360, 364, 370, 264 P; 303/116.1, DIG. 11

[56]         References Cited

U.S. PATENT DOCUMENTS

| | | |
|---|---|---|
| 2,821,273 | 1/1958 | Sanford et al. . |
| 2,879,867 | 3/1959 | Rike . |
| 3,420,342 | 1/1969 | Botterill . |
| 4,014,410 | 3/1977 | Bryant . |
| 4,415,070 | 11/1983 | Pickering et al. . |
| 4,557,363 | 12/1985 | Golan . |
| 4,706,459 | 11/1987 | Burckhardt . |
| 4,799,575 | 1/1989 | Kroniger . |
| 4,893,879 | 1/1990 | Middelhoven et al. . |
| 5,397,174 | 3/1995 | Willmann . |
| 5,445,242 | 8/1995 | Pogorzelski et al. . |
| 5,630,656 | 5/1997 | Stewart, Jr. ........................... 303/9.62 |
| 5,649,746 | 7/1997 | Stewart, Jr. ........................... 188/351 |

FOREIGN PATENT DOCUMENTS

| | | |
|---|---|---|
| 1 954 733 | 5/1971 | Germany . |
| 1 680 016 | 8/1971 | Germany . |
| 33 36 114A1 | 5/1985 | Germany . |
| 41 39 136A1 | 6/1993 | Germany . |
| 42 30 889A1 | 3/1994 | Germany . |
| 5-131908 | 5/1993 | Japan . |
| 530 151 | 12/1940 | United Kingdom . |
| 2 079 393 | 1/1982 | United Kingdom . |
| WO 90/10565 | of 0000 | WIPO . |
| WO 83/04432 | 12/1983 | WIPO . |

*Primary Examiner*—Chris Schwartz
*Attorney, Agent, or Firm*—Flynn, Thiel, Boutell & Tanis, P.C.

[57]           ABSTRACT

A method of cooling a brake fluid using a brake operating unit which comprises a first and a second flow channels connected to a cylinder of a brake element at one ends thereof comprises a step of setting the absolute value of a difference between the amount of brake fluid supplied to and that discharged from the cylinders in the first flow channel to apply and release brakes respectively equal to the absolute value of a difference between the amount of the brake fluid supplied to and that discharged from the cylinder in the second flow channel to apply and release the brakes respectively, so as to circulate the brake fluid in the cylinder using both of the first and second flow channels by repetition of applying and releasing the brakes. As a result, it is possible to provide a method of and a device for cooling a brake fluid, wherein vapor-lock can be prevented with certainty, the brake element that is a drum brake or a disc brake is improved in safety and reliability, friction materials such as brake shoes or pads are restrained from rising in temperature and a fade phenomenon is also reduced so that a stable braking operation can be obtained.

24 Claims, 7 Drawing Sheets

FIG. 5
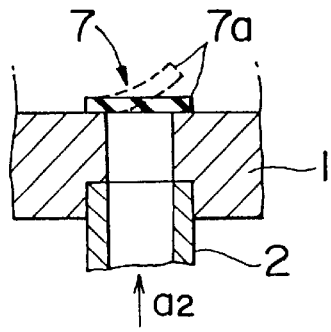
FIG. 6
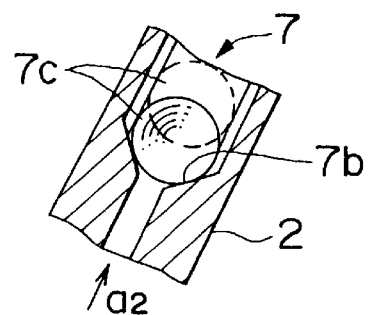
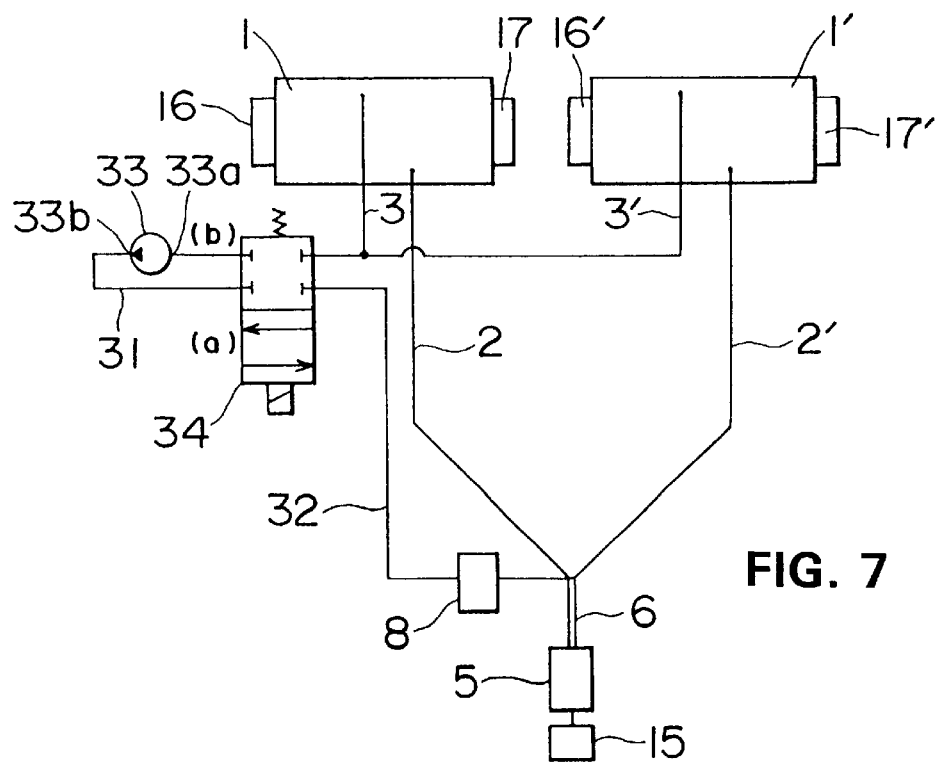
FIG. 7

FIG. 10
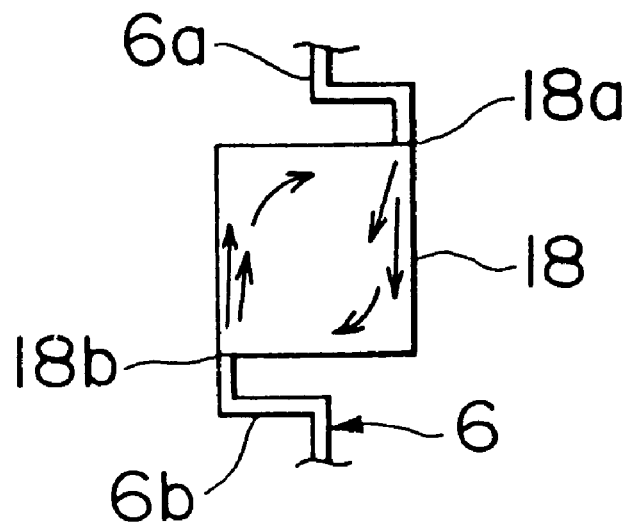
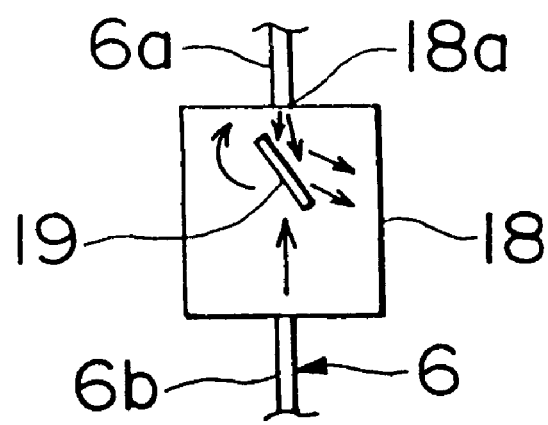
FIG. 11

METHOD OF AND DEVICE FOR COOLING BRAKE FLUID

This is a division of Ser. No. 08/521,057, filed Aug. 29, 1995, now U.S. Pat. No. 5,954,166.

BACKGROUND OF THE INVENTION

1. Field of the Invention

The present invention relates to a method of and a device for cooling a brake fluid.

2. Prior Art

There is known a conventional brake operating unit comprising a brake element that is a drum brake or a disc brake. That is, a fluid (liquid) pressure generating unit composed of, e.g., a master cylinder is actuated by depressing a brake pedal to supply a brake fluid to a cylinder of the brake element, the amount of the brake fluid corresponding to the depressed amount of the brake pedal, so as to generate a braking force, or the fluid pressure generating unit is released by releasing the brake pedal from being depressed to discharge the brake fluid in the cylinder of the brake element so as to release the braking force. At the time of releasing the brakes, the brake fluid in the cylinder of the brake element is discharged therefrom by the elastic restoring force of a shoe return spring in case of a drum brake, and by that of a seal ring in case of a disc brake. The brake element generates a braking force when friction materials of brake shoes or pads slidably contacts a brake drum or disc while generating a frictional heat.

In such a conventional brake operating unit, however, only a single brake line (fluid channel) is connected to the cylinder of brake element for both supply and discharge of the brake fluid, so that the brake fluid only moves into or out of the cylinder therethrough but it is not substantially exchanged with a brake fluid of low temperature. As a result, frequent repetition of applying the brakes generates a vapor-lock to cause a dangerous state of brake failure. The vapor-lock is a phenomenon caused by the failure of normal transmission of pressure when the brake fluid in the cylinder of a brake element is overheated so that a part of it is vaporized and gasified. Although it is proposed to cool the brake element by sending air thereto for preventing the vapor-lock, a brake element which can prevent the vapor-lock with certainty has not appeared yet.

SUMMARY OF THE INVENTION

The present invention has been made in view of such a problem of the conventional technology to provide a method of cooling a brake fluid and a device used therein as follows.

A method of cooling a brake fluid using a brake operating unit which comprises a first and a second flow channels 2 and 3 connected to a cylinder 1 or 20 of a brake element at one ends thereof according to a first aspect of the invention is characterized in comprising a step of setting the absolute value of a difference between the amount of brake fluid supplied to and that discharged from the cylinder 1 or 20 in the first flow channel 2 to apply and release the brakes respectively equal to the absolute value of a difference between the amount of brake fluid supplied to and that discharged from the cylinder 1 or 20 in the second flow channel 3 to apply and release the brakes respectively so as to circulate the brake fluid in the cylinder 1 or 20 using both of the first and second flow channels 2 and 3 by repetition of applying and releasing the brakes.

A device for cooling a brake fluid according to a second aspect of the invention is that of the first aspect of the invention characterized in that the cylinder 20 is of plural-pot type for a disc brake that is a brake element.

A device for cooling a brake fluid according to a third aspect of the invention is that of the first aspect of the invention characterized in that at least one of the first and second flow channels 2 and 3 is composed of a plurality of lines.

A device for cooling a brake fluid according to a fourth aspect of the invention is characterized in that one ends of a first flow channel 2 and a second flow channel 3 are connected to a cylinder 1 or 20 of a brake element while the other ends thereof are connected to a fluid pressure generating unit 5 which generates fluid pressure in accordance with a depressed amount of a brake pedal 15 and at least one of the first and second flow channels 2 and 3 is provided with at least a means 7, 10, 11, or 12 and 13 for generating a difference between the amount of brake fluid supplied to and that discharged from the cylinders 1 or 20 to apply and release the brakes respectively, wherein the absolute value of a difference between the amount of the brake fluid supplied to and that discharged from the cylinder 1 or 20 in the first flow channel 2 to apply and release the brakes respectively is made equal to the absolute value of a difference between the amount of the brake fluid supplied to and that discharged from the cylinder 1 or 20 in the second flow channel 3 to apply and release the brakes respectively so as to circulate the brake fluid in the cylinder 1 or 20 using both of the first and second flow channels 2 and 3.

A device for cooling a brake fluid according to a fifth aspect of the invention is that of the fourth aspect of the invention characterized in that the other ends of both of the first and second flow channels 2 and 3 are connected to the fluid pressure generating unit 5 by way of a main fluid channel 6.

A device for cooling a brake fluid according to a sixth aspect of the invention is that of the fourth aspect of the invention characterized in that at least a tank 8 is interposed in a channel composed of the first and second flow channels 2 and 3 for storing the brake fluid which circulates in the first and second flow channels 2 and 3, the tank 8 forming a part of the channel.

A device for cooling a brake fluid according to a seventh aspect of the invention is that of the fourth aspect of the invention characterized in that the first and second flow channels 2 and 3 are connected to each other at least at one end portions thereof by way of at least a connecting member 84 or 84₁ to 84₆ or 84a and 84b.

A device for cooling a brake fluid according to an eighth aspect of the invention is that of the fourth aspect of the invention characterized in that the cylinder 20 is of plural-pot type for a disc brake that is a brake element.

A device for cooling a brake fluid according to a ninth aspect of the invention is that of the sixth aspect of the invention characterized in that at least one of tanks 8 comprises a tank body 80 which is divided inside into a plurality of liquid chambers 80a(, 80b) and 80c by at least a partition 81 (and 82) having at least an opening portion 81a(and 82a respectively), wherein neighboring liquid chambers 80a and (80b or 80b and) 80c are communicated with one another by way of the opening portion 81a (and 82a), the liquid chamber 80a located at one end of the tank body 80 is connected to a hot side of one of the first and second flow channels 2 and 3 while the liquid chamber 80c located at the other end of the tank body 80 is connected to a cool side of one of the first and second flow channels 2 and 3.

A device for cooling a brake fluid according to a tenth aspect of the invention is that of the sixth aspect of the invention characterized in that the means 7, 10, 11, or 12 and 13 is attached to the tank 8.

A device for cooling a brake fluid according to an eleventh aspect of the invention is characterized in that one ends of a first flow channel 2 and a second flow channel 3 are connected to a cylinder 1 or 20 of a brake element, the other end of the first flow channel 2 is connected to a fluid pressure generating unit 5 which generates fluid pressure in accordance with the depressed amount of a brake pedal 15 and the other end of the second flow channel 3 is connected to the first flow channel 2 and a pump 33 is interposed in the second flow channel 3 thereby to circulate brake fluid in the cylinders 1 or 20 using both of the first flow channel 2 and the second flow channel 3 by actuating the pump.

A device for cooling a brake fluid according to a twelfth aspect of the invention is that of the eleventh aspect of the invention characterized in that a closing valve unit 34 is provided for both of an inlet 33a side of the pump 33 and an outlet 33b side of the pump 33, the closing valve unit 34 being open at a time of actuating the pump 33 concurrently at both sides thereof.

A device for cooling a brake fluid according to a thirteenth aspect of the invention is that of the eleventh aspect of the invention characterized in that the other ends of both of the first and second flow channels 2 and 3 are connected to the fluid pressure generating unit 5 by way of a main fluid channel 6.

A device for cooling a brake fluid according to a fourteenth aspect of the invention is that of the eleventh aspect of the invention characterized in that at least a tank 8 is interposed in a channel composed of the first and second flow channels 2 and 3 for storing the brake fluid which circulates in the first and second flow channels 2 and 3, the tank 8 forming a part of the channel.

A device for cooling a brake fluid according a fifteenth aspect of the invention is that of the eleventh aspect of the invention characterized in that the first and second flow channels 2 and 3 are connected to each other at least at one end portions thereof by way of at least a connecting member 84 or 84$_1$ to 84$_6$ or 84a and 84b.

A device for cooling a brake fluid according to a sixteenth aspect of the invention is that of the eleventh aspect of the invention characterized in that the cylinder 20 is of plural-pot type for a disc brake that is a brake element.

A device for cooling a brake fluid according to a seventeenth aspect of the invention is that of the twelfth aspect of the invention characterized in that the closing valve unit 34 is divided into a closing valve for closing an inlet 33a side of the pump 33 and a closing valve for closing an outlet 33b side of the pump 33.

A device for cooling a brake fluid according to an eighteenth aspect of the invention is that of the fourteenth aspect of the invention characterized in that at least one of tanks 8 comprises a tank body 80 which is divided inside into a plurality of liquid chambers 80a(, 80b) and 80c by at least a partition 81 (and 82) having at least an opening portion 81a (and 82a respectively), wherein neighboring liquid chambers 80a and (80b or 80b and )80c are communicated with one another by way of the opening portion 81a (and 82a), the liquid chamber 80a located at one end of the tank body 80 is connected to a hot side of one of the first and second flow channels 2 and 3 while the liquid chamber 80c located at the other end of the tank body 80 is connected to a cool side of one of the first and second flow channels 2 and 3.

A device for cooling a brake fluid according to a nineteenth aspect of the invention is characterized in that one end of a main fluid channel 6 is connected to a cylinder 1 or 20 of a brake element and the other end of the main fluid channel 6 is connected to a fluid pressure generating unit 5 which generates liquid pressure in accordance with the depressed amount of a brake pedal 15, while a fluid supply and discharge tank 18 is provided at a middle portion of the main fluid channel 6 to form a part of the main fluid channel 6 so as to divide the main fluid channel 6 into a first main fluid channel 6a and a second fluid channel 6b, which are disposed between the cylinder 1 or 20 and the fluid supply and discharge tank 18 and between the fluid supply and discharge tank 18 and the fluid pressure generating unit 5 respectively, wherein a capacity D of the first main fluid channel 6a is set to a size which allows a part of brake fluid which is actually discharged from the cylinder 1 or 20 at a time of releasing brakes to flow into the fluid supply and discharge tank 18 and a capacity C of the fluid supply and discharge tank 18 is set to a size which is not filled with a brake fluid which is actually discharged from the cylinder 1 or 20 at a time of releasing the brakes.

According to the invention described in the first and fourth aspects of the invention, since the amount of brake fluid supplied to the cylinder 1 or 20 is equal to that discharged therefrom at the time of operating the brake, the following functions can be obtained. Applying and releasing (taking off) the brakes generate a difference between the amount of the brake fluid supplied to and that discharged from the cylinder 1 or 20 accompanying the application and release of the brakes respectively through the first flow channel 2 and a difference between the amount of the brake fluid supplied to and that discharged from the cylinder 1 or 20 accompanying the application and release of the brakes respectively through the second flow channel 3. Since both of the differences are equal to each other in absolute value, if they are not zero, the repetition of operating the brake circulates the brake fluid in the cylinder 1 or 20 of a brake element through both of the first and second flow channels 2 and 3 for operating the brake. When the brake fluid circulates in the first and second flow channels 2 and 3, it is cooled by air. As a result, it is almost certain that the brake fluid in the cylinder 1 or 20 of the brake element is prevented from being overheated by heat generated accompanying the operation of the brakes.

According to the second aspect of the invention, in a disc brake that is a brake element, the plural-pot type cylinder 20 can obtain a function similar to the first aspect of the invention with regard to circulating and cooling the brake fluid.

According to the third aspect of the invention, the brake fluid flows in the first and/or second flow channel 2 and/or 3, one being composed of a plurality of lines. As a result, they function similar to the first aspect of the invention with regard to circulating and cooling the brake fluid.

According to the fifth aspect of the invention, the brake fluid from the fluid pressure generating unit 5 is pushed out into the main fluid channel 6 and the first flow channel 2 or the second flow channel 3 and circulates therethrough. As a result, a function similar to the fourth aspect of the invention can be obtained with respect of circulating and cooling the brake fluid.

According to the sixth aspect of the invention, when the brake fluid circulates in the first flow channel 2 and the second flow channel 3, it is temporarily stored in the tank 8 which forms a part of the channel. The presence of the tank 8 increases the amount of the brake fluid to almost certainly prevent the brake fluid in the cylinder 1 or 20 from being overheated by heat generated accompanying the operation of the brakes even if the first and second flow channels 2 and 3 are made short.

According to the seventh aspect of the invention, the connecting member 84, or $84_1$, $84_2$, $84_3$, $84_4$, $84_5$, $84_6$, or 84a and 84b which keeps the first and second flow channels 2 and 3 apart from each other leaving a given space at least at one end portions thereof to prevent friction and abrasion therebetween.

According to the eighth aspect of the invention, in the disc brake that is a brake element, the plural-pot type cylinder 20 can obtain a function similar to that of the fourth aspect of the invention with respect to circulating and cooling the brake fluid.

According to the ninth aspect of the invention, the circulating brake fluid flows into the liquid chamber 80a located at one end of the tank body 80 of the tank 8 from the first flow channel 2 or the second flow channel 3 at the hot side, reaches the liquid chamber 80c located at the other end of the tank body 80 through the opening portion 81a (and 82a) of the partition 81 (and 82) and flows from the liquid chamber 80c into the first flow channel 2 or the second flow channel 3 at the cool side toward the cylinder 1 or 20. Accordingly, the brake fluid which has been cooled by air in the tank body 80 of the tank 8 is gradually reduced in temperature as it flows in the liquid chambers 80a(, 80b) and 80c and the eventually cooled brake fluid flows into the first flow channel 2 or the second flow channel 3 at the cool side. As a result, the cool brake fluid flows into the cylinder 1 or 20 so that the brake fluid in the cylinder 1 or 20 is effectively prevented from being overheated by heat generated accompanying the operation of the brakes.

According to the tenth aspect of the invention, the means 7, 10, 11, or 12 and 13 provided at least in one of the first and second flow channels 2 and 3 of the above fourth aspect of the invention is attached to the tank 8 of the sixth aspect of the invention. As a result, it is possible to make the brake operating unit compact in size.

According to the eleventh aspect of the invention, the following function can be obtained. When the pump 33 is actuated, the brake fluid in the cylinder 1 or 20 flows through the first flow channel 2 and the second flow channel 3 and gradually flows back to the cylinder 1 or 20. Accordingly, it is possible to circulate the brake fluid in the cylinder 1 or 20 through both of the first flow channel 2 and the second flow channel 3.

As described above, the brake fluid which serves in the cylinder 1 or 20 for operating the brake is cooled by air as it passes through the first flow channel 2 and the second flow channel 3, so that it is prevented from being overheated by heat accompanying the application of the brakes. Since the replaced amount of the brake fluid in the cylinder 1 or 20 depends on time during which the pump 33 is operated, it is almost certain to prevent the brake fluid in the cylinder 1 or 20 from being overheated by adjusting the operating time of the pump 33.

According to the twelfth aspect of the invention, since the closing valve unit 34 is open when the pump 33 is operated, the brake fluid which has entered the pump 33 through the inlet 33a thereof is discharged from the outlet 33b for circulation. The circulation of the brake fluid is stopped with certainty by closing the closing valve unit 34 when the operation of the pump 33 is stopped.

According to the thirteenth aspect of the invention, the brake fluid from the fluid pressure generating unit 5 is pushed out into the main fluid channel 6 and the brake fluid in the main fluid channel 6 is supplied to the cylinder 1 or 20 through the first flow channel 2 to obtain a braking force.

According to the fourteenth aspect of the invention, when the brake fluid circulates in the first flow channel 2 and the second flow channel 3, it is temporarily stored in the tank 8 which forms a part of the channel. The presence of the tank 8 increases the amount of the brake fluid to almost certainly prevent the brake fluid in the cylinder 1 or 20 from being overheated by heat generated accompanying the operation of the brakes even if the first and second flow channels 2 and 3 are made short.

According to the fifteenth aspect of the invention, the connecting member 84 or $84_1$, $84_2$, $84_3$, $84_4$, $84_5$, $84_6$, or 84a and 84b which keeps the first and second fluid channels 2 and 3 apart from each other leaving a given space at least one end portions thereof to prevent friction and abrasion therebetween.

According to the sixteenth aspect of the invention, in the disc brake that is a brake element, the plural-pot type cylinder 20 can obtain a function similar to that of the eleventh aspect of the invention with respect to circulating and cooling the brake fluid.

According to the seventeenth aspect of the invention, a pair of closing valves function similarly to the closing valve unit 34 of the twelfth aspect of the invention. As a result, a function similar to that of the twelfth aspect of the invention can be obtained.

According to the eighteenth aspect of the invention, a function similar to that of the ninth aspect of the invention can be obtained with regard to the tank 8. As a result, the cool brake fluid flows into the cylinder 1 or 20 so that the brake fluid in the cylinder 1 or 20 is effectively prevented from being overheated by heat generated accompanying the operation of the brakes.

According to the nineteenth aspect of the invention, when the brake pedal 15 is depressed, the brake fluid pushed out into the main fluid channel 6 from the fluid pressure generating unit 5 flows into the cylinder 1 or 20 by way of a second main fluid channel 6b, the fluid supply and discharge tank 18 and a first main fluid channel 6a. At that time, a part of the brake fluid in the fluid supply and discharge tank 18 actually flows into the cylinder 1 or 20.

Thereafter, when the brake is released, the brake fluid flows back from the cylinder 1 or 20 toward the fluid pressure generating unit 5. At that time, a part of the brake fluid which is actually discharged from the cylinder 1 or 20 flows into the fluid supply and discharge tank 18 to mingle with a comparatively cool brake fluid therein. When the brakes are applied next, a part of the brake fluid which has been mixed in the fluid supply and discharge tank 18 to be comparatively cool actually flows into the cylinder 1 or 20 so as to be mixed with the brake fluid remaining therein, so that the brake fluid in the cylinder 1 or 20 is reduced in temperature. In this way, every time the brakes are applied and released, a part of the brake fluid in the cylinder 1 or 20 is replaced with the comparatively cool brake fluid in the fluid supply and discharge tank 18 so that the temperature rise of the brake fluid in the cylinder 1 or 20 is restrained. Moreover, accompanying the release of the brakes, a part of the brake fluid in the fluid supply and discharge tank 18, i.e., a brake fluid as much as that actually discharged from the cylinder 1 or 20 at the time of releasing the brakes flows into the second main fluid channel 6b, and flows into the fluid supply and discharge tank 18 at the time of applying the brakes.

Therefore, the volume of the brake fluid capable of taking part in the cylinder 1 or 20 for operating the brakes is limited to the capacity of the cylinder in the conventional brake operating unit, while it becomes the capacity of the cylinder 1 or 20+the capacity D of the first main fluid channel 6a+the capacity C of the fluid supply and discharge tank 18 according to the present invention, so that it is not only increased by the capacity D of the first main fluid channel 6a+the capacity C of the fluid supply and discharge tank 18, but also the brake fluid is cooled by air also in the first main fluid channel 6a and the fluid supply and discharge tank 18 so as to promote a temperature decrease of the brake fluid in the cylinder 1 or 20. As a result, the brake fluid in the cylinder 1 or 20 is prevented from being overheated by heat generated accompanying the operation of the brakes.

BRIEF DESCRIPTION OF THE DRAWINGS

FIG. 5 is a cross-sectional view showing a structure of a check valve;

FIG. 6 is a cross-sectional view showing the other structure of the check valve;

FIG. 7 is a view showing a brake operating unit equipped with a device for cooling a brake fluid according to a fifth embodiment of the invention;

FIG. 10 is a view for explaining a structure of a fluid supply and discharge tank in FIG. 8;

FIG. 11 is a view for explaining the other structure of the fluid supply and discharge tank in FIG. 8;

DESCRIPTION OF THE PREFERRED EMBODIMENT

The preferred embodiments of the invention will be described hereinafter with reference to drawings.

Figure 1:
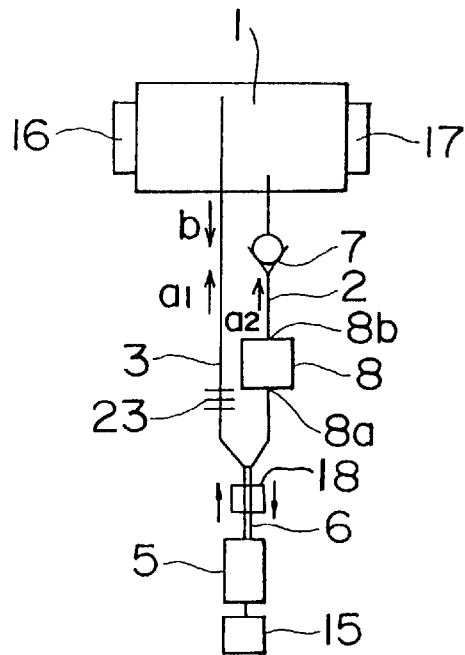
FIG. 1 is a view showing a brake operating unit equipped with a device for cooling a brake fluid according to a first embodiment of the invention.

FIG. 1 shows a device for cooling a brake fluid according to a first embodiment of the invention applied to a drum brake unit. In the figure, denoted at 1 is a cylinder of a brake element (a drum brake), i.e., a wheel cylinder of a drum brake for a vehicle. A pair of pistons 16 and 17 are slidably fitted into the cylinder 1 for expanding a distance between a pair of brake shoes, not shown. First and second flow channels 2 and 3, at respective one ends thereof, are connected to the pressure chamber of the cylinder 1 of the brake element and are merged into one end of a main fluid channel 6 at the other ends thereof and are further connected to the pressure chamber of a fluid (liquid) pressure generating unit 5 composed of, e.g., a master cylinder by way of the main fluid (liquid) channel 6. The first and second flow channels 2 and 3 and the merging portion of the main fluid channel 6 at one end portion thereof are flexible to permit the relative vertical movement between the chassis (body) of the vehicle and the non-suspended portion thereof. Denoted at 15 is a brake pedal.

The fluid pressure generating unit 5 comprises a booster of a servo brake and a brake valve for a full-power brake other than the master cylinder. The servo brake makes use of fluid pressure generated by vacuum, compressed air or a hydraulic pump. As boosters for the servo brake there are a hydraulic vacuum servo and a hydraulic air servo systems disposed between the master cylinder and the cylinder 1, an air over hydraulic booster disposed between an air brake valve and the cylinder 1 and the like. The full power brake supplies a pressurized fluid (liquid) generated by a pump to the cylinder 1 under control of a brake valve interlocked with the depressed amount of the brake pedal 15 so as to generate a braking force.

The first flow channel 2 is provided with a check valve 7 interposed therein as a means for generating a difference between the amount of brake fluid supplied to the cylinder 1 accompanying the application of the brakes and the amount of brake fluid discharged from the cylinder 1 accompanying the release of the brakes. The check valve 7 provided in the first flow channel 2 permits the flowing amount $a_2$ of brake fluid into the cylinder 1 from the fluid pressure generating unit 5 and restrains the flowing amount of brake fluid from the cylinder 1 toward the fluid pressure generating unit 5 (a flow in a direction reverse to that of the flowing amount $a_2$). A normal check valve can be used as the check valve 7, and in addition to this, since it is desirable to permit the flowing amount $a_2$ with resistance as little as possible, for example, a device that is similar in structure to the primary cup of the master cylinder can be fixed in the first flow channel 2 for this purpose. The check valve 7 need not entirely shut off the flow in the reverse direction to that of the flowing amount $a_2$ but may be also designed to restrain the flow partially.

A tank 8 for storing the brake fluid therein is provided in the first flow channel 2 in series with the check valve 7. The tank 8 is provided for increasing the amount of the circulating brake fluid by keeping back the same, the tank 8 forming a part of the flow channel with an inlet port 8a and an outlet port 8b which are disposed apart from each other and at which the tank 8 is connected to the first flow channel 2. It is a matter of course that the tank 8 is larger in cross section than the first flow channel 2. It is also possible to integrally form the first flow channel 2, the second flow channel 3 and the check valve 7 (as well as the tank 8) into a single housing and fix the housing to a non-rotating portion of a vehicle such as the external surface of the cylinder 1, the back plate of a drum brake etc.

FIG. 5 shows a structure of a check valve 7. The check valve 7 composed of a plate-shaped valve body 7a made of rubber or elastomer which is bonded to the inner wall of the cylinder 1 at one end portion (left end portion in the figure) thereof is normally restored to the original state as indicated by a solid line in FIG. 5 by elasticity and gravity to close the first flow channel 2 while getting out of the strokes of the pistons 16 and 17. Whereas the valve body 7a is elastically deformed as indicated by a broken line in FIG. 5 to open the first flow channel 2 so as to allow the brake fluid to flow into the cylinder 1 from the fluid pressure generating unit 5 as much as the flowing amount $a_2$ and is seated on the inner wall of the cylinder 1 to restrain the flow of the brake fluid from the cylinder 1 toward the fluid pressure generating unit 5 (a flow in a direction reverse to that of the flowing amount $a_2$).

FIG. 6 shows the other structure of the check valve 7. The check valve 7 is composed of a valve seat 7b, which has a shape of a cone gradually upwardly increasing in diameter and is provided at a middle portion of an inclined first flow channel 2, and a valve body 7c which has a shape of a ball and is disposed in the first flow channel 2 without being urged by a spring so that it can be seated in the valve seat 7b. The brake fluid is allowed to flow into the cylinder 1 from the fluid pressure generating unit 5 as much as the flowing amount $a_2$ when the valve body 7c is pushed up as illustrated by the broken line in FIG. 6 to open the first flow channel 2, and is restrained from flowing from the cylinder 1 toward the fluid pressure generating unit 5 when the valve body 7c is seated in the valve seat 7b by gravity to close the first flow channel 2.

When the brake pedal 15 is depressed in a brake operating unit equipped with the device for cooling a brake fluid, the brake fluid pushed out into the main fluid channel 6 from the fluid pressure generating unit 5 and the brake fluid in the main fluid channel 6 is branched into the first and second flow channels 2 and 3, i. e., a part of the brake fluid flows into the cylinder 1 as much as the flowing amount $a_2$ through the first flow channel 2 by way of the tank 8 and the check valve 7, while the other part flows directly into the cylinder 1 as much as a flowing amount $a_1$ through the second flow channel 3. As a result, the pistons 16 and 17 which are slidably fitted in the cylinder 1 are respectively pushed out therefrom to expand a distance between a pair of brake shoes, not shown, to obtain a braking force.

Successively, when the brake is released, the brake fluid in the cylinder 1 flows back toward the fluid pressure generating unit 5. At that time, since the flow from the cylinder 1 toward the fluid pressure generating unit 5 is restrained by the check valve 7 in the first flow channel 2, the brake fluid does not flow substantially therein, so that it flows through the second flow channel 3 as much as a flowing amount b and consequently the brake fluid is discharged through the second flow channel 3 in large quantity compared with that supplied therethrough. Since the amount of the brake fluid supplied to the cylinder 1 is substantially equal to that discharged therefrom in a cycle of applying and releasing the brakes, the brake fluid in the cylinder 1 is replaced by the amount of $b-a_1$ in the cycle. A brake fluid is supplied to the cylinder 1 through the first flow channel 2 as much as the amount $b-a_1$ of the brake fluid that flows out of the same. The brake fluid that has flowed out of the cylinder 1 flows into the first flow channel 2 by way of the second flow channel 3, pooled (stored) in the tank 8 and then flows back to the cylinder 1 through the first flow channel 2 so as to circulate for braking operation as the operation of the brakes is repeated.

The brake fluid used in the cylinder 1 for operating the brakes is gradually cooled by air as it flows through the second flow channel 3, the tank 8 and the first flow channel 2 so as to be prevented from being overheated by heat generated accompanying the operation of the brakes. As a result, vapor-lock caused by the vaporization of the brake fluid can be effectively prevented. Since the boiling point of the brake fluid when the same absorbs moisture (wet boiling point) is about 140° C., it is possible to prevent almost all the conventional vapor-lock by setting the amount of the brake fluid in the second flow channel 3, the tank 8 and the first flow channel 2 and the amount of replaced brake fluid so that the brake fluid in the cylinder 1 is not overheated over 140° C.

The function of the device for cooling a brake fluid will be described in detail hereinafter. The check valve 7 positively generates in the first flow channel 2 a difference between the amount of the brake fluid supplied to the cylinder 1 accompanying the application of the brakes and that discharged from the cylinder 1 accompanying the release of the brakes to increase the former. Due to the function of the check valve 7, the brake fluid is supplied to the cylinder 1 accompanying the application of the brake through both of the first and second flow channels 2 and 3 while the brake fluid is discharged from the cylinder 1 accompanying the release of the brakes through the second flow channel 3 mainly so that in the second flow channel 3 the amount of the brake fluid discharged from the cylinder 1 becomes large in quantity compared with the amount of the brake fluid supplied to the cylinder 1. As a result, a value of a difference between the amount of the brake fluid supplied to the cylinder 1 accompanying the application of the brakes and the amount of the brake fluid discharged from the cylinder 1 accompanying the release of the brakes in the first flow channel 2 (which is equal to the amount of the brake fluid supplied to the cylinder 1 supposing that the back current of the check valve 7 is zero) is identical with the inversed value of a difference $(a_1-b)$ between the amount of the brake fluid supplied to the cylinder 1 accompanying the application of the brakes and the amount of the brake fluid discharged from the cylinder 1 accompanying the release of the brakes through the second flow channel 3. That is, the absolute value of the difference between the amounts of supply and discharge in the first flow channel 2 is equal to that in the second flow channel 3. Thus it is possible to circulate the brake fluid in the cylinder 1 using both of the first and second flow channels 2 and 3.

As described above, the device for cooling a brake fluid of the invention circulates the brake fluid in the cylinder 1 using the first and second flow channels 2 and 3, so that nothing should intervene in one of the first and second flow channels 2 and 3 to impede the circulation of the brake fluid other than the means for generating the difference between the amount of the brake fluid supplied to the cylinder 1 accompanying the application of the brakes and the amount of the brake fluid discharged from the cylinder 1 accompanying the release of the brakes. Therefore, in case a safety cylinder which impedes the circulation of the brake fluid is provided, the first and second flow channels 2 and 3 are disposed at the side of the cylinder 1 relative to the safety cylinder. The safety cylinder shuts off a fluid channel (brake line) at the side where the brake fluid is leaking to secure the function of other portions in the system in case the brake fluid leaks.

Incidentally, providing a cooling fin 23 on at least a part of the first and second flow channels 2 and 3 further increases the effect of cooling the brake fluid by air. It is possible to omit the tank 8 if the brake fluid is cooled sufficiently by the fin 23 while it flows in the first and second flow channels 2 and 3. In case of providing the tank 8, it may be provided where the brake fluid circulates, so that it can be provided on the second flow channel 3 too. It is a matter of course that the cooling fin 23 can be provided on the tank 8, too. Moreover, the connecting portions for connecting the one ends of the first and second flow channels 2 and 3 to the cylinder 1 had better be apart from each other as far as possible so that the brake fluid may flow into the cylinder 1 from the first flow channel 2 and flow out therefrom into the second flow channel 3 relatively smoothly for replacement without interfering each other. However, it is also possible to form one end portions of the first and second flow channels 2 and 3 as one body which is cylindrical in external shape and screw the united end portions thereof into a portion of the cylinder 1. In this case, it is advisable to connect flexible pipes to at least one of the first and second flow channels 2 and/or 3 for extending the same into the cylinder 1 so as to place the inlet and the outlet apart from each other therein. It is a matter of course that the one ends of the first and second flow channels 2 and 3 are connected to an or plural openings of the cylinder 1 which is not closed by the pistons 16 and 17.

Although the check valve 7 is provided in the first flow channel 2 to allow the brake fluid to flow into the cylinder 1 from the fluid pressure generating unit 5 as much as the flowing amount $a_2$ and restrain the flow of the brake fluid from the cylinder 1 toward the fluid pressure generating unit 5 (in a direction reverse to that of the flowing amount $a_2$) in the first flow channel 2 in the above embodiment, similar effect can be obtained also by omitting the check valve 7 and providing the other check valve in the second flow channel 3 to thereby allow the brake fluid to flow into the cylinder 1 from the fluid pressure generating unit 5 as much as the flowing amount $a_1$ and restrain the flow of the brake fluid from the cylinder 1 toward the fluid pressure generating unit 5 (in a direction reverse to that of the flowing amount $a_1$) in the second flow channel 3.

Figure 2:
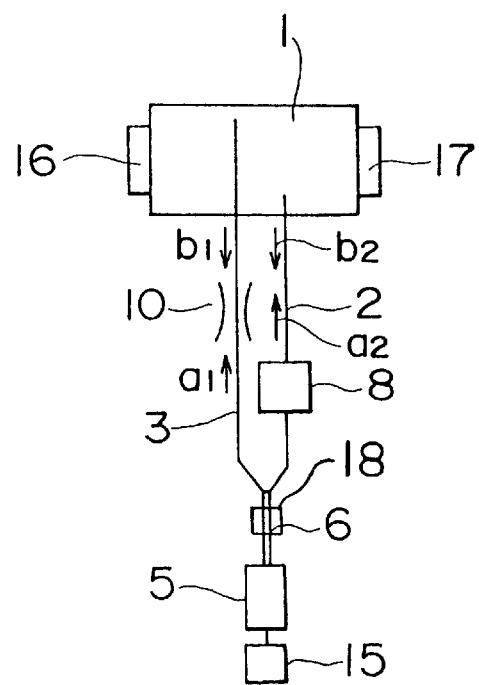
FIG. 2 is a view showing a brake operating unit equipped with a device for cooling a brake fluid according to a second embodiment of the invention.

FIG. 2 shows a device for cooling a brake fluid according to a second embodiment of the invention, wherein components substantially having the same function as those of the first embodiment are denoted at the same numerals and the explanations thereof are omitted. According to the second embodiment, a narrow portion 10 (contraction of area) is provided in the second flow channel 3 as a means for generating a difference between the amount of the brake fluid supplied to the cylinder 1 accompanying the application of the brakes and the amount of the brake fluid discharged from the cylinder 1 accompanying the release of the brakes. The narrow portion 10 restrains the fast flowing amount $a_1$ of the brake fluid into the cylinder 1 from the fluid pressure generating unit 5 accompanying a normal application of the brakes and effectively allows a slow flowing amount $b_1$ of the brake fluid toward the fluid pressure generating unit 5 from the cylinder 1 accompanying the release of the brakes.

When the brake pedal 15 is depressed in the brake operating unit equipped with the device for cooling a brake fluid, the brake fluid strongly pushed out into the main fluid channel 6 from the fluid pressure generating unit 5 mainly passes through the first flow channel 2 to flow into the cylinder 1. That is, from the first flow channel 2 the brake fluid freely flows into the cylinder 1 through the tank 8 while from the second flow channel 3 the brake fluid is restrained from flowing into the cylinder 1 by the narrow portion 10. In this way, mainly the brake fluid which flows into the cylinder 1 from the first flow channel 2 pushes out the pistons 16 and 17 slidably fitted in the cylinder 1 to expand a distance between a pair of brake shoes, not shown, to obtain a braking force.

Successively, when the brakes are released, the brake fluid flows back toward the fluid pressure generating unit 5 from the cylinder 1. At that time, the brake fluid flows back through the first and second flow channels 2 and 3 almost similarly. Since the narrow portion 10 in the second flow channel 3 provides a large resistance to a fast flow of the brake fluid accompanying the normal depression of a brake pedal 15, but does not to the slow flow of the brake fluid accompanying the return of the pistons 16 and 17 by the resilience of a return spring, not shown, there positively occurs a difference between the amount of the brake fluid supplied to the cylinder 1 accompanying the application of the brakes and the amount of the brake fluid discharged from the cylinder 1 accompanying the release of the brakes in the second flow channel 3.

Accordingly, the brake fluid is supplied to the cylinder 1 accompanying the application of the brakes mainly through the first flow channel 2 and is discharged from the cylinder 1 accompanying the release of the brakes through both of the first and second flow channels 2 and 3, so that the amount of the brake fluid discharged through the second flow channel 3 becomes large in quantity compared with that supplied therethrough. As a result, the absolute value of a difference in the first flow channel 2 between the flowing amount $a_2$ of the brake fluid supplied to the cylinder 1 accompanying the application of the brakes and the flowing amount $b_2$ of the brake fluid discharged from the cylinder 1 accompanying the release of the brakes becomes equal to the absolute value of a difference in the second flow channel 3 between the flowing amount $a_1$ of the brake fluid supplied to the cylinder 1 accompanying the application of the brakes and the flowing amount $b_1$ of the brake fluid discharged from the cylinder 1 accompanying the release of the brakes.

The brake fluid that has flowed into the cylinder 1 through the first flow channel 2 gradually flows out through the second flow channel 3 by the repetition of applying and releasing the brakes. The brake fluid that has flowed out of the second flow channel 3 flows into the tank 8 through the first flow channel 2 to be temporarily stored therein, then flows into the cylinder 1 through the first flow channel 2 for circulation. Thus the brake fluid that has been used in the cylinder 1 for the application of the brakes is cooled by air while it flows through the second flow channel 3, the tank 8 and the first flow channel 2 so as to be prevented from being overheated by heat generated accompanying the operation of the brakes and obtain a similar effect to the first embodiment.

Figure 3:
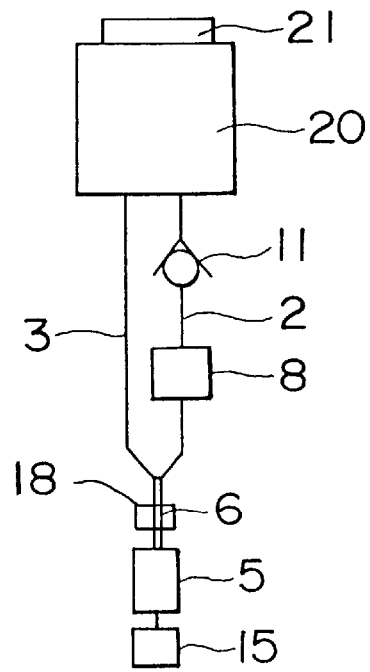
FIG. 3 is a view showing a brake operating unit equipped with a device for cooling a brake fluid according to a third embodiment of the invention.

FIG. 3 shows a device for cooling a brake fluid according to a third embodiment of the invention applied to a disc brake, and components substantially having the same functions as those of the first embodiment are denoted at the same numerals and the explanations thereof are omitted. According to the third embodiment, one ends of the first and second flow channels 2 and 3 are connected to the pressurized chamber of a cylinder 20 of a caliper in a disc brake unit. A piston 21 slidably engages the cylinder 20. The cylinder 20 may be also of plural-pot type such as a two-pot type having a pair of pistons 21, further a three-pot type and the like. In case of the plural-pot type, the first and second flow channels 2 and 3 are divided into the number of the plural pots at one ends thereof to be connected to the pots of the cylinder 20 respectively. A check valve 11 is provided in the first flow channel 2 for restraining the brake fluid from flowing into the cylinder 20 from the fluid pressure generating unit 5 and allowing the brake fluid to flow toward the fluid pressure generating unit 5 from the cylinder 20 as a means for generating a difference between the amount of the brake fluid supplied to the cylinder 20 accompanying the application of the brakes and that discharged from the cylinder 20 accompanying the release of the brakes.

When a brake pedal 15 is depressed in the brake operating unit equipped with the device for cooling a brake fluid, the brake fluid that has been pushed out into the main fluid channel 6 from the fluid pressure generating unit 5 flows into the cylinder 20 through the second flow channel 3 in large quantity. That is, the brake fluid freely flows into the cylinder 20 through the second flow channel 3, but it is restrained by the check valve 11 from flowing into the cylinder 20 through the first flow channel 2. Thus the large quantity of the brake fluid flowing into the cylinder 20 through the second flow channel 3 pushes out the piston 21 slidably engaging the cylinder 20 to obtain a braking force by way of a pair of pads of a disc brake, not shown.

Successively, when the brakes are released, the brake fluid flows back toward the fluid pressure generating unit 5 from the cylinder 20. At that time, the brake fluid flows back almost similarly through both of the first and second flow channels 2 and 3. In this way, the amount of the brake fluid supplied to the cylinder 20 accompanying the application of the brakes is little in the first flow channel 2 due to the function of the check valve 11, so that the amount of the brake fluid discharged from the cylinder 20 accompanying the release of the brakes becomes larger than that supplied to the cylinder 20 to positively generate a difference therebetween. As a result, the absolute value of a difference in the first flow channel 2 between the amount of the brake fluid supplied to the cylinder 20 accompanying the application of the brakes and that discharged from the cylinder 20 accompanying the release of the brakes becomes equal to the absolute value of a difference in the second flow channel 3 between the amount of the brake fluid supplied to the cylinder 20 accompanying the application of the brakes and that discharged from the cylinder 20 accompanying the release of the brakes.

Accordingly, by the repetition of applying and releasing the brakes, the brake fluid that has flowed into the cylinder 20 through the second flow channel 3 gradually flows out from the first flow channel 2 to be stored in the tank 8, and thereafter flows back to the cylinder 20 through the second flow channel 3 for circulation. As a result, the brake fluid that has been used in the cylinder 20 for applying the brakes is cooled by air while it flows through the first flow channel 2, the tank 8 and the second flow channel 3 so as to be prevented from being overheated and obtain a similar effect to that of the first embodiment.

Although the check valve 11 is provided in the first flow channel 2 for restraining the brake fluid from flowing into the cylinder 20 from the fluid pressure generating unit 5 while allowing the brake fluid to flow toward the fluid pressure generating unit 5 from the cylinder 20 in the first flow channel 2, it is also possible to obtain a similar effect also by omitting the check valve 11 and providing the other check vale in the second flow channel 3 for restraining the brake fluid from flowing into the cylinder 20 from the fluid pressure generating unit 5 while allowing the brake fluid to flow toward the fluid pressure generating unit 5 from the cylinder 20 in the second flow channel 3.

Figure 4:
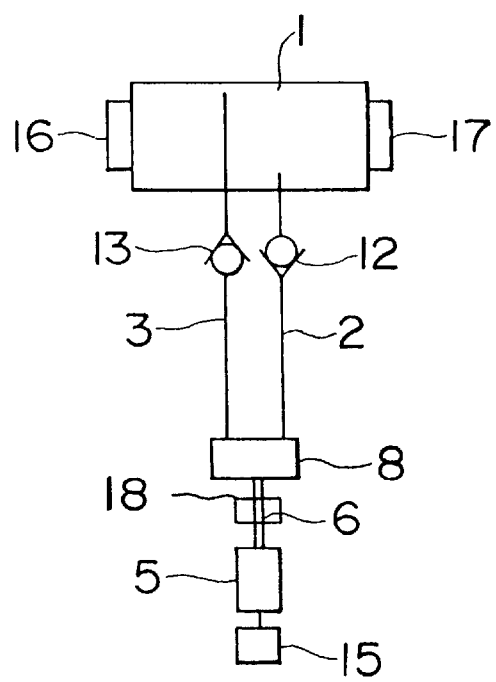
FIG. 4 is a view showing a brake operating unit equipped with a device for cooling a brake fluid according to a fourth embodiment of the invention.

FIG. 4 shows a device for cooling a brake fluid according to a fourth embodiment of the invention and components substantially having the same functions as those of the first embodiment are denoted at the same numerals and the explanations thereof are omitted. According to the fourth embodiment, a check valve 12 is provided in the first flow channel 2 for allowing the brake fluid to flow from the fluid pressure generating unit 5 toward the cylinder 1 and restraining the brake fluid from flowing from the cylinder 1 toward the fluid pressure generating unit 5 as a means for generating a difference between the amount of the brake fluid supplied to the cylinder 1 accompanying the application of the brakes and that discharged from the cylinder 1 accompanying the release of the brakes. Also a check valve 13 is provided in the second flow channel 3 for restraining the brake fluid from flowing toward the cylinder 1 from the fluid pressure generating unit 5 and allowing the brake fluid to flow toward the fluid pressure generating unit 5 from the cylinder 1 as a similar means. Moreover, the tank 8 for storing the brake fluid therein is disposed at the other end portions of the first and second flow channels 2 and 3, i.e., where they are connected to the main fluid channel 6.

When the brake pedal 15 is depressed in the brake operating unit equipped with the device for cooling a brake fluid, the brake fluid pushed out into the main fluid channel 6 from the fluid pressure generating unit 5 flows into the cylinder 1 in large quantity through the first flow channel 2. That is, from the first flow channel 2 the brake fluid flows into the cylinder 1 through the check valve 12 while from the second flow channel 3 the brake fluid is restrained from flowing into the cylinder 1 by the check valve 13 . Thus the pistons 16 and 17 slidably fitted in the cylinder 1 are pushed out to obtain a braking force by way of a pair of brake shoes of a drum brake, not shown.

Successively, when the brakes are released, the brake fluid flows back toward the fluid pressure generating unit 5 from the cylinder 1. At that time, the brake fluid in the cylinder 1 is restrained from flowing out therefrom through the first flow channel 2 by the check valve 12 while the brake fluid in the cylinder 1 is allowed to flow out therefrom through the second flow channel 3 in large quantity by the check valve 13. In this way, the absolute value of a difference in the first flow channel 2 between the amount of the brake fluid supplied to the cylinder 1 accompanying the application of the brakes and that discharged from the cylinder 1 accompanying the releasing of the brakes becomes equal to the absolute value of a difference in the second flow channel 3 between the amount of the brake fluid supplied to the cylinder 1 accompanying the application of the brakes and that discharged from the cylinder 1 accompanying the releasing of the brakes.

By the repetition of applying and releasing the brakes, the brake fluid that has flowed into the cylinder 1 through the first flow channel 2 gradually flows out from the second flow channel 3 to be pooled in the tank 8, and thereafter flows back to the cylinder 1 through the first flow channel 2 for circulation. Accordingly, the brake fluid that has been used in the cylinder 1 for the application of the brakes is cooled by air while it flows through the second flow channel 3, the tank 8 and the first flow channel 2 so as to be prevented from being overheated and obtain a similar effect to that of the first embodiment. According to the fourth embodiment, however, the brake fluid is supplied to the cylinder 1 through the first flow channel 2 in large quantity and is discharged therefrom through the second flow channel 3 in large quantity, so that the brake fluid in the cylinder 1 is replaced rapidly. As a result, the brake fluid in the cylinder 1 is effectively prevented from being overheated. Incidentally, it is not always necessary for the check valves 12 and 13 to completely shut off the backward flows so long as the brake fluid flows through the first flow channel 2 into the cylinder 1 in large quantity compared with the amount of discharge and is discharged through the second flow channel 3 from the cylinder 1 in large quantity compared with the amount of supply.

Although the first and second flow channels 2 and 3 are connected to the fluid pressure generating unit 5 by way of the main fluid channel 6 according to the first to fourth embodiments set forth above, it is also possible to obtain a similar effect with respect to the circulation of the brake fluid by omitting the main fluid channel 6 and directly connecting the first and second flow channels 2 and 3 to the fluid pressure generating unit 5. Moreover, the present invention is also applicable to a brake operating unit equipped with an anti-skid braking system. In this case, the first and second flow channels 2 and 3 are disposed at the side of the cylinder 1 or 20 relative to a pressure adjusting unit 18 equipped with a pump, an electromagnetic valve, etc. for making the brake fluid circulate in case the brake fluid is discharged toward the pressure adjusting unit and also it is supplied to the cylinder 1 or 20 from the pressure adjusting unit. Furthermore, it is also possible to obtain a function substantially similar to those of the first to fourth embodiments set forth above by providing the plurality of check valves 7, 11 or 12 in the first flow channel 2, and/or providing the plurality of narrow portions 10 or check valves 13 in the second flow channel 3.

Figure 12:
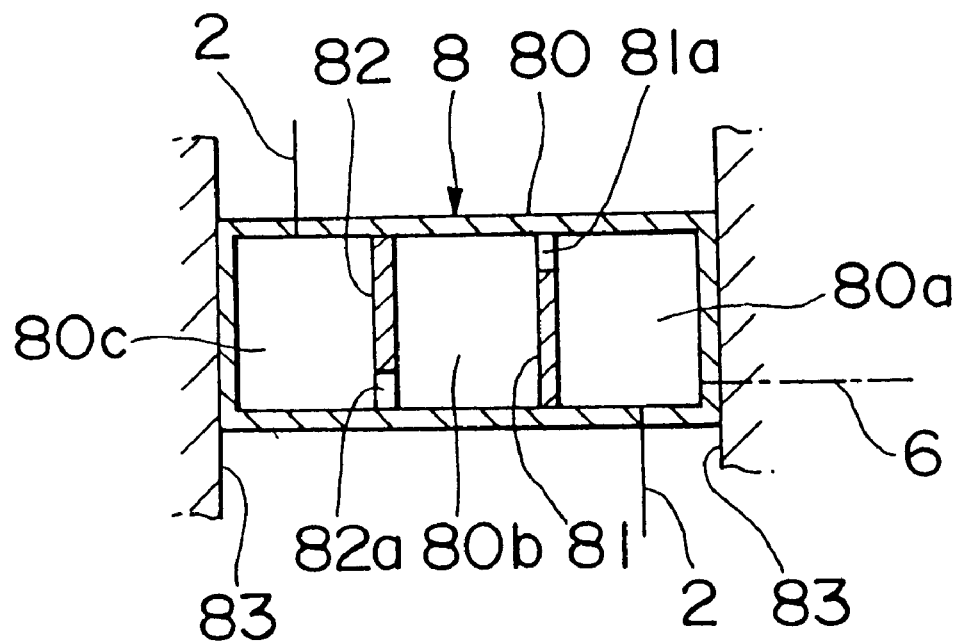
FIG. 12 is a cross-sectional view of a tank shown in FIGS. 1, 2, 3, 4 and 7.

According to the first to fourth embodiments, similarly to the fifth embodiment described later, the tank 8 has a structure as illustrated in FIG. 12. That is, the tank body 80 of the tank 8 is divided inside into a plurality of liquid chambers 80a(, 80b) and 80c by at least (two in this embodiment) a partition 81 (and 82), neighboring liquid chambers 80a(, 80b) and 80c communicating with each other by way of at least a (or plural) opening portion(s) 81a(and 82a respectively). The liquid chamber 80a located at one end of the tank body 80 is connected to one of the first and second flow channels 2 and 3 at the hot side while the liquid chamber 80c located at the other end of the tank body 80 is connected to one of the first and second flow channels 2 and 3 at the cool side. That is, in case of the tank 8 illustrated in FIGS. 1 to 3 respectively showing the first to third embodiments, the liquid chambers 80a and 80c located at both ends of the tank body 80 are connected to the first flow channel 2 as illustrated in FIG. 12. In case of the tank 8 according to the fourth embodiment as illustrated in FIG. 4, the liquid chamber 80a located at one end of the tank body 80 is connected to the second flow channel 3 at the hot side, while the liquid chamber 80c located at the other end of the tank body 80 is connected to the first flow channel 2 at the cool side. The tank body 80 of the tank 8 is fixed to a body 83 of the vehicle having a comparatively low temperature of a vehicle in a state wherein the former contacts with the latter over an area as large as possible.

In case one end of the main fluid channel 6 is connected to the tank 8 like the fourth embodiment as illustrated in FIG. 4, one of the liquid chambers 80a, 80b and 80c may be connected to the main fluid channel 6. As a result, a part of the brake fluid in one of the liquid chambers 80a, 80b and 80c that flows into the main fluid channel 6 when the brakes are released is effectively cooled by air in the main fluid channel 6. Moreover, if the second flow channel 3 at hot side instead of the first flow channel 2 as well as the main fluid channel 6 indicated by a chain line in FIG. 12 are connected to the liquid chamber 80a located at one end of the tank body 80, a part of the brake fluid in the liquid chamber 80a into which a hot brake fluid flows from the cylinder 1 and which is in a state of high temperature flows into the main fluid channel 6 to be effectively cooled by air therein when the brakes are released.

As for the tank 8 described above, the hot brake fluid flowing out from the cylinder 1 or 20 enters the liquid chamber 80a located at one end of the tank body 80 by way of the first flow channel 2 or the second flow channel 3 at hot side, gradually flows into the central liquid chamber 80b through the opening portion 81a accompanying the repetition of applying and releasing the brakes, further flows into the liquid chamber 80c located at the other end of the tank body 80 gradually through the opening portion 82a and flows out through the first flow channel 2 (or the second flow channel 3) at the cool side. Hereby, the brake fluid that is cooled by air in the tank 8 is gradually reduced in temperature as it flows through the liquid chambers 80a, 80b and 80c and the cooled brake fluid flows out through the first flow channel 2 (or the second flow channel 3) at the cool side for circulation. As a result, the cool brake fluid flows into the cylinder 1 or 20 so as to effectively prevent the brake fluid in the cylinder 1 or 20 that is a brake element from being overheated by heat accompanying the operation of the brakes. Moreover, since the tank body 80 of the tank 8 is fixed to the body 83, the body 83 serves as a radiating fin to effectively cool the brake fluid in the tank 8. Contact between the tank 8 and the body 83 over an area as large as possible effects good conduction of heat.

Furthermore, if the first flow channel 2 or the second flow channel 3 at the hot side is connected to the upper end portion of the liquid chamber 80a located at one end of the tank body 80, the first flow channel 2 (or the second flow channel 3) at the cool side is connected to the lower end portion of the liquid chamber 80c located at the other end of the tank body 80 and the opening portions 81a and 82a is formed in the lower end portions of the liquid chambers 80a, 80b and 80c which is low in temperature so as to be apart from the portions of the tank body 80 to which the first flow channel 2 or the second flow channel 3 is connected, the hot brake fluid flowing into the upper end portion of the liquid chamber 80a located at one end of the tank body 80 from the first flow channel 2 or the second flow channel 3 at the hot side is prevented from keeping the high temperature when it flows into the central liquid chamber 80b, and still furthermore, the brake fluid of low temperature in the lower end portion of the liquid chamber 80c located at the other end of the tank body 80 flows out through the first flow channel 2 at the cool side, so that the brake fluid can be effectively reduced in temperature in the tank 8. It is a matter of course that the opening portions 81a and 82a had better be formed apart from each other. It is also possible to arrange the first flow channel 2 or the second flow channel 3 at the hot side and the second flow channel 3 at the cool side depending on the arrangement of the means 7, 10, 11, or 12 and 13 or the narrow portion 10.

If the tank body 80 is made of metal and the partitions 81 and 82 are made of a material having small heat conductivity other than metals, e.g., synthetic resin, radiation of heat from the tank body 80 is promoted and conduction of heat between neighboring liquid chambers 80a, 80b and 80c defined by the partitions 81 and 82 is restrained to keep the differences of temperature between the brake fluids in adjacent liquid chambers 80a(, 80b) and 80c. As a result, the brake fluid flowing out from the first flow channel 2 (or the second flow channel 3) at the cool side can be effectively reduced in temperature. It is also possible to provide the means 7, 10, 11, or 12 and 13 or the narrow portion 10 attached to the tank 8 so as to make the brake operating unit compact.

Still furthermore, it is also possible to provide a or a plurality of tanks 8 in which at least a tank 8 may have a tank body 80 divided inside into a plurality of liquid chambers 80a, 80b and 80c and other tanks 8 may have a single liquid chamber, or one or all tanks 8 may be composed of oil coolers having the well-known structure for cooling the brake fluid.

Figure 13:
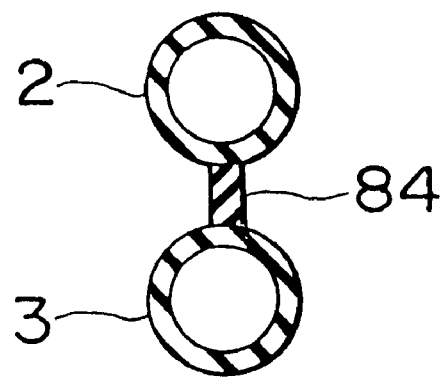
FIG. 13 is a cross-sectional view of a first and a second flow channels shown in FIGS. 1, 2, 3, 4 and 7.
Figure 14:
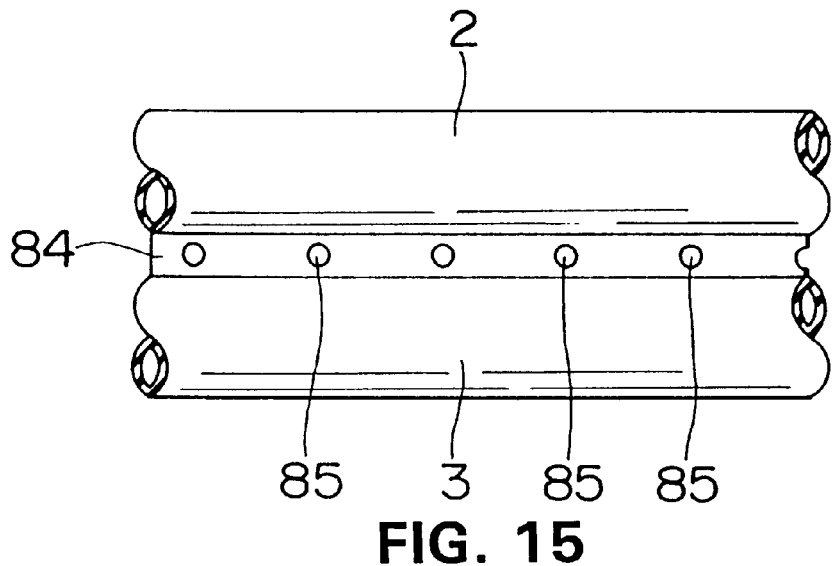
FIG. 14 is a view showing a first and a second flow channels equipped with a connecting member.

In case the first flow channel 2 and the second flow channel 3 are made of flexible brake (rubber) hoses at least at one end portions thereof, i.e., at the side of the cylinder 1 or 20 to permit a relative vertical movement between the chassis of a vehicle and the non-suspended portion thereof, the adjacent facing flexible portions of the first and second flow channels 2 and 3 are connected to each other by way of a flexible connecting member 84 as illustrated in FIGS. 13 and 14. In concrete, the outer rubber covers of the first and second flow channels 2 and 3 each made of a brake hose are connected to each other by way of the connecting member 84 mainly made of rubber or elastomer. Hereby the first and second flow channels 2 and 3 are kept apart from each other at a given interval by the connecting member 84, so that the first and second flow channels 2 and 3 can be prevented from mutual friction and abrasion while being flexible. As illustrated in FIG. 14, the connecting member 84 having a plurality of opening portions 85 therein formed between the first and second flow channels 2 and 3 over the whole length thereof in the axial direction can have a cooling function by way of the opening portions 85 while effectively securing the connecting function between the first and second flow channels 2 and 3.

Figure 15:
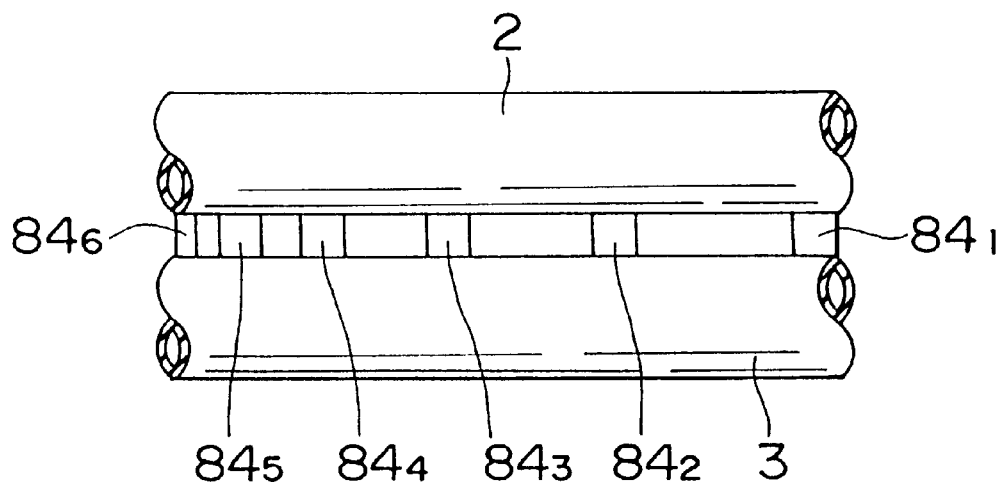
FIG. 15 is a view showing the first and second flow channels equipped with a connecting member having another structure.

As illustrated in FIG. 15, a plurality of connecting members $84_1$, $84_2$, $84_3$, $84_4$, $84_5$ and $84_6$ arranged between the first and second flow channels 2 and 3 at given intervals in the axial direction thereof can reduce in mass and weight the connecting member 84 by the omitted portions and can restrain the temperature rise of the first and second flow channels 2 and 3 at the cool side due to the reduction of heat conduction by way of the connecting members $84_1$, $84_2$, $84_3$, $84_4$, $84_5$ and $84_6$ between the first and second flow channels 2 and 3 having a temperature difference. In order to reconcile reducing heat conduction through the connecting members $84_1$, $84_2$, $84_3$, $84_4$, $84_5$ and $84_6$ and securing the connecting performance and promote the reduction in temperature of the brake fluid flowing into the cylinder 1 or 20 from the first flow channel 2 or the second flow channel 3 at the cool side, it is desirable to set the intervals among the adjacent connecting members $84_1$, $84_2$, $84_3$, $84_4$, $84_5$ and $84_6$ in such a way that the intervals far from the cylinder 1 or 20 is smaller than those close thereto.

Figure 16:
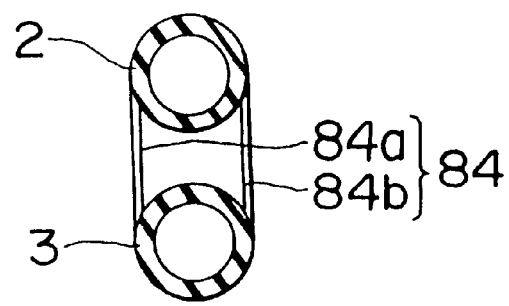
FIG. 16 is a cross-sectional view of the first and second flow channels equipped with a connecting member having still another structure.

When the flexible first and second flow channels 2 and 3 are connected to each other by way of connecting members 84a and 84b disposed apart from each other in the radial direction of cross sections of the first and second flow channels 2 and 3 as illustrated in FIG. 16, the connecting members 84a and 84b each having a small cross section effect good connecting performance and further reduce heat conduction. The pair of connecting members 84a and 84b disposed in the radial direction of cross sections of the first and second flow channels 2 and 3 can be also arranged to be shifted relative to each other in the axial direction of the first and second flow channels 2 and 3. As described above, it is also possible to connect the first and second flow channels 2 and 3 together by a connecting member made of an inflexible material while securing the flexibility of the first and second flow channels 2 and 3 if the connecting member is divided into a plurality of connecting members $84_1$, $84_2$, $84_3$, $84_4$,$84_5$ and $84_6$, or 84a and 84b in this way.

FIG. 7 shows a device for cooling a brake fluid according to a fifth embodiment of the invention and components substantially having the same functions as those of the first embodiment are denoted at the same numerals and the explanations thereof are omitted. According to the fifth embodiment, the first flow channels 2 and 2' and the second flow channels 3 and 3' are respectively connected at respective one ends thereof to the cylinders 1 and 1' of drum brakes, which are each provided at either the pair of front wheels or the pair of rear wheels, while the other ends of the first flow channels 2 and 2' merging together and the other ends of the second flow channels 3 and 3' merging together are connected to each other by way of a first connecting flow channel 31 and a second connecting flow channel 32 connected to each other in series. The first and second connecting flow channels 31 and 32 form a part of the second flow channels 3 and 3'.

A closing valve unit 34 is interposed between the other ends of the second flow channels 3 and 3' merging together and one end of the first connecting flow channel 31 and between the other end of the first connecting flow channel 31 and one end of the second connecting flow channel 32 to open and close the former and the latter channels concurrently, and a pump 33 is interposed in the first connecting flow channel 31 for pumping the brake fluid from the second flow channels 3 and 3' toward the first flow channels 2 and 2'. The closing valve units 34, which is an open-close changeover valve, more in concrete, a slide spool valve composed of two 2-port/2-position selectors, concurrently open a channel between the second flow channels 3 and 3' and the first connecting flow channel 31 and that between the first connecting flow channel 31 and the second connecting flow channel 32 at an opening position a and concurrently closes the same at a closing position b. Accordingly, it means that the closing valves are provided at both of the inlet 33a side and the outlet 33b side of the pump 33. Accordingly, the two closing valves disposed at the inlet 33a side and the outlet 33b side of the pump 33 can also obtain a function similar to that of the single closing valve unit 34 set forth above. Moreover, the tank 8 for pooling the brake fluid therein is provided in the second connecting flow channel 32.

When the pump 33 is actuated with the closing valves 34 at the opening position a, the brake fluid in the cylinders 1 and 1' pass through the second flow channels 3 and 3' respectively and through the first and second connecting flow channels 31 and 32 successively to be stored in the tank 8, then flows into the first flow channels 2 and 2' from the other ends thereof to flow back to the cylinders 1 and 1'. Accordingly, it is possible to circulate the brake fluid in the cylinders 1 and 1' using both of the first flow channels 2 and 2' and the second flow channels 3 and 3'(and 31 and 32). Since the amount of the brake fluid taken into the inlet 33a of the ump 33 is equal to that discharged from the outlet 33b of the pump 33, the mount of the brake fluid is not fluctuated in the cylinders 1 and 1' and the fluid pressure generating unit 5 by actuating the pump 33.

As described above, the brake fluid used in the cylinders 1 and 1' for the operation of the brakes is cooled by air while it passes through the second flow channels 3 and 3', the first and second connecting flow channels 31 and 32, the tank 8 and the first flow channels 2 and 2' so as to be prevented from being overheated by heat accompanying the operation of the brakes, so that a similar effect to the first embodiment can be obtained. According to the fifth embodiment, however, the replaced amount of the brake fluid in the cylinders 1 and 1' depends on the amount of the brake fluid which flows into the inlet 33a of the pump 33 and flows out from the outlet 33b thereof, i.e., the operating time of the pump 33, so that the brake fluid in the cylinders 1 and 1' is effectively prevented from being overheated by adjusting the operating time of the pump 33. It is a matter of course that a sufficient amount of the brake fluid is accommodated in the second flow channels 3 and 3', the first and second connecting flow channels 31 and 32, the tank 8 and the first flow channels 2 and 2'. The fifth embodiment is also applicable to a single cylinder 1. At that time the other cylinder 1' and the first flow channel 2' and second flow channel 3' which are connected to the other cylinder 1' are omitted.

Such a device for cooling a brake fluid as described above is suitable for a brake operating unit equipped with an anti-skid braking system. In this case, a pump in a pressure adjusting unit of the anti-skid braking system can be used as the pump 33. As a matter of course, the brake fluid cooling unit is operated while preventing the flow of the brake fluid for the anti-skid braking system by a closing valve, not shown, when the anti-skid braking system s not operated. The operation of the anti-skid braking system is secured by setting the closing valve unit 34 to the closing position b.

The device for cooling a brake fluid should be operated when the brake pedal 15 is released from being depressed and, e.g., (1) the brake fluid in the cylinders 1 and 1' is directly or indirectly detected to be above a given temperature (e.g., 100° C.), (2) the frequency of depression of the brake pedal 15 per unit time exceeds a given frequency, (3) the number of depression of the brake pedal 15 exceeds a given number irrespective of the length of time, (4) every given time while the engine is driven, and the like. Needless to say, it is possible to obtain a similar effect in case the brake fluid is pumped toward the second flow channels 3 and 3' from the first flow channels 2 and 2' by the pump 33. It is also possible to obtain a similar effect by providing an individual pump 33 at each of the cylinders 1 and 1' and actuating the same. Moreover, it is also possible to obtain a similar effect with regard to the circulation of the brake fluid by omitting the main fluid channel 6 to directly connect the first flow channel 2 and the second connecting flow channel 32 to the fluid pressure generating unit 5. It is also possible to discharge the brake fluid in the cylinders 1 and 1' through the second flow channels 3 and 3' to introduce the same into a or plurality accumulators, not shown, and return the brake fluid in the accumulator to the first flow channels 2 and 2' by actuating the pump 33 in order to prevent the wheels from being locked in the anti-skid braking system. Furthermore, in the first to fifth embodiments, at least one of the first flow channels 2 and 2' and/or the second flow channels 3 and 3' can also be composed of a plurality of lines to obtain a similar effect with regard to the circulation of the brake fluid.

Figure 8:
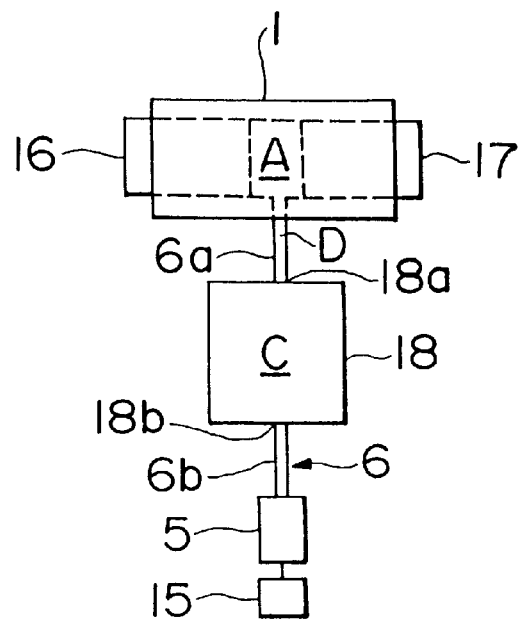
FIG. 8 is a view showing a brake operating unit equipped with a device for cooling a brake fluid according to a sixth embodiment of the invention.
Figure 9:
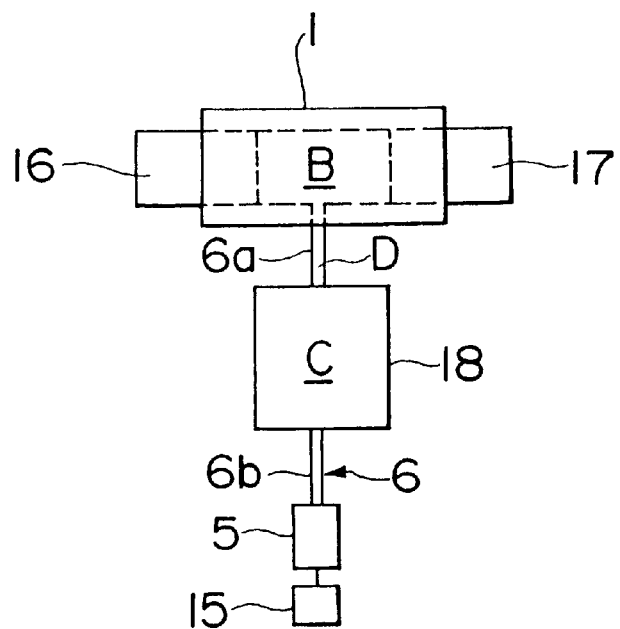
FIG. 9 is a view for explaining the application of the device for cooling a brake fluid in FIG. 8.

FIGS. 8 and 9 shows a device for cooling a brake fluid according to a sixth embodiment of the invention and components substantially having the same functions as those of the first embodiment are denoted at the same numerals and the explanations thereof are omitted. According to the sixth embodiment, the first and second flow channels 2 and 3 are omitted and the main fluid channel 6 composed of the first and second main fluid channels 6a and 6b is connected to the cylinder 1 at one end thereof and interposes the fluid supply and discharge tank 18 therein. That is, the first main fluid channel 6a is connected to the pressure chamber of the cylinder 1 at one end thereof and to the fluid supply and discharge tank 18 at the other end thereof, and the second main fluid channel 6b is connected to the fluid supply and discharge tank 18 at one end thereof and to the pressure chamber of the fluid pressure generating unit 5 at the other end thereof. The fluid supply and discharge tank 18 is provided for the purpose of mixing up therein the brake fluid to be supplied to the cylinder 1, wherein an entrance 18a that is a connecting portion to the first main fluid channel 6a at the side of the cylinder 1 and an entrance 18b that is a connecting portion to the second main fluid channel 6b at the side of the fluid pressure generating unit 5 are separately provided apart from each other and the fluid supply and discharge tank 18 constitutes a part of the main fluid channel 6. The cross-sectional area of the fluid supply and discharge tank 18 is set to be at least larger than (preferably more than twice as large as) that of the first main fluid channel 6a.

The capacity of the first main fluid channel 6a is set so that a part of the brake fluid actually discharged from the cylinder 1 when the brakes are released can flow into the fluid supply and discharge tank 18 and the capacity of the fluid supply and discharge tank 18 is set so that the fluid supply and discharge tank .18 may not be filled with the brake fluid actually discharged from the cylinder 1 when the brakes are released. As a result, it does not occur that the brake fluid actually discharged from the cylinder 1 when the brakes are released fills the fluid supply and discharge tank 18 and thereafter flows out therefrom through the second main fluid channel 6b. Accordingly, a part of the brake fluid actually discharged from the cylinder 1 when the brakes are released flows into a part of the fluid supply and discharge tank 18 to be mixed with brake fluid remaining therein, and when the brakes are applied next, the mixed brake fluid in the fluid supply and discharge tank 18 flows back into the cylinder 1.

Hereupon, the following relations are given assuming that the capacity of the pressure chamber of the cylinder 1 is A when the brakes are released wherein a pair of pistons 16 and 17 are contracted into the cylinder 1 as illustrated in FIG. 8, the capacity of the pressure chamber of the cylinder 1 is B when the brakes are applied wherein a pair of pistons 16 and 17 are protruded as illustrated in FIG. 9, the capacity of the fluid supply and discharge tank 18 is C and the capacity of the first main fluid channel 6a is D. When the capacities A and B of the pressure chambers of the cylinder 1 fluctuates due to the abrasion of friction members of brake shoes, they are set to values with due consideration of the fluctuation.

That is, it is desirable that the capacity D of the first main fluid channel 6a is as small as possible (the first main fluid channel 6a is as short as possible) for mixing the brake fluid (B−A) actually discharged from the cylinder 1 when the brakes are released with the brake fluid in the fluid supply and discharge tank 18. Therefore, the capacity D of the first main fluid channel 6a is set to $9/10$ of (B−A) at maximum, preferably less than $3/5$, more preferably less than ½ thereof so that it is set that the brake fluid amounting to more than $1/10$, or more than $2/5$ or more than ½ of the amount (B−A) of the brake fluid actually discharged from cylinder 1 when the brakes are released may actually flow into the fluid supply and discharge tank 18. In this way, a part (substantially more than $1/10$~½) of the brake fluid actually discharged from the cylinder 1 when the brakes are released flows into a part of the fluid supply and discharge tank 18 to be mixed with brake fluid remaining therein, and when the brakes are applied next, the mixed brake fluid in the fluid supply and discharge tank 18 flows back into the cylinder 1 as much.

The capacity C of the fluid supply and discharge tank 18 is desirable to be as large as possible for restraining the temperature rise of the brake fluid in the fluid supply and discharge tank 18, at least as large as to satisfy C>(B−A), preferably more than 1.5 (B−A), more preferably more than 2 (B−A) so as to increase the amount of the brake fluid capable of participating in the application of the brakes in the cylinder 1 to (B+D+C). Incidentally, the amount of the brake fluid capable of participating in the application of the brakes in the cylinder 1 in a conventional brake element is limited by the capacity B of the pressure chamber of the cylinder so that it is impossible to increase the amount of the brake fluid capable of participating in the application of the brakes in the cylinder 1 so long as the cylinder 1 is not enlarged.

When the brake pedal 15 is depressed in a brake operating unit equipped with the device for cooling a brake fluid, the brake fluid pushed out into the main fluid channel 6 from the fluid pressure generating unit 5 flows into the cylinder 1 through the second main fluid channel 6b, the fluid supply and discharge tank 18 and the first main fluid channel 6a.

As a result, the pistons 16 and 17 slidably engaging the cylinder 1 are pushed out to operate a pair of brake shoes, not shown, to obtain a braking force. At that time, a part of the brake fluid in the fluid supply and discharge tank 18 actually flows into the cylinder 1.

Successively, when the brakes are released, the brake fluid flows back from the cylinder 1 toward the fluid pressure generating unit 5. At that time, a part of the brake fluid actually discharged from the cylinder 1 flows into the fluid supply and discharge tank 18 to be mixed with the brake fluid having a comparatively low temperature therein so that it becomes comparatively low in temperature. When the brakes are applied next, a part of the brake fluid having a comparatively low temperature in the fluid supply and discharge tank 18 actually flows into the cylinder 1 to be mixed with the brake fluid therein, so that the brake fluid in the cylinder 1 is reduced in temperature.

As described above, every time when the brakes are applied and released, a part of the brake fluid in the cylinder 1 is replaced with the brake fluid having a comparatively low temperature in the fluid supply and discharge tank 18 so that the temperature of the brake fluid in the cylinder 1 is restrained from rising. Moreover, accompanying the release of the brakes, a part of the brake fluid in the fluid supply and discharge tank 18, i.e., the brake fluid (B–A) as much as that actually discharged from the cylinder 1 when the brakes are released flows into the second main fluid channel 6b and flows back into the fluid supply and discharge tank 18 when the brakes are applied. The amount of the brake fluid flowing into or out of the second main fluid channel 6b is equal to that flowing in a conventional brake hose (fluid channel). As a result, not only the amount of the brake fluid capable of participating in the application of the brakes in the cylinder 1 is increased, but also is cooled by air in the first main fluid channel 6a and the fluid supply and discharge tank 18 too, so as to promote a decrease in temperature of the brake fluid in the cylinder 1.

As described above, the brake fluid in the cylinder 1 is effectively prevented from being overheated by heat accompanying the operation of the brakes. As a result, it is possible to obtain almost similar effect to the first embodiment with respect to the decrease in temperature of the brake fluid in the cylinder 1. According to the sixth embodiment, however, being different from the first to fifth embodiments, the brake fluid does not circulate but directly flows into the cylinder 1 after having been mixed in the fluid supply and discharge tank 18, so that a large decrease in temperature of the brake fluid cannot be expected. Therefore, it is suitable for a vehicle which is comparatively light and does not require a large braking force, in concrete, an ordinary passenger car.

FIG. 10 shows a structure of the fluid supply and discharge tank 18. an entrance 18a that is a connecting portion to the first main fluid channel 6a at the side of the cylinder 1 and an entrance 18b that is a connecting portion to the second main fluid channel 6b at the side of the fluid pressure generating unit 5 are provided in the fluid supply and discharge tank 18 to diagonally confront each other therein. As a result, the brake fluid flows into the fluid supply and discharge tank 18 through the pair of entrances 18a and 18b to generate a whirlpool therein so as to be mixed well. FIG. 11 shows the other structure of the fluid supply and discharge tank 18, wherein a plate-shaped flow restricting member 19 is provided aslant between the pair of entrances 18a and 18b. In the fluid supply and discharge tank 18 having this structure, the brake fluid flowing thereinto runs against the flow restricting member 19 to be dispersed therein so that the comparatively hot brake fluid flowing into the fluid supply and discharge tank 18 through the entrance 18a at the cylinder 1 side is prevented from directly flowing out through the same entrance 18a. It is also possible to provide a plurality of flow restricting members 19 in the fluid supply and discharge tank 18 for dispersing the brake fluid flowing thereinto.

It is also possible to integrally form the first main fluid channel 6a and the fluid supply and discharge tank 18 of a hard material, e.g., metal and fix one end portion of the first main fluid channel 6a to the outer wall of the cylinder 1. At that time, if the fluid supply and discharge tank 18 is disposed at a position higher than the cylinder 1, the comparatively hot brake fluid in the cylinder 1 flows into the fluid supply and discharge tank 18 through the first main fluid channel 6a by natural convection. It is also possible to form the first main fluid channel 6a larger in diameter than the second main fluid channel 6b or in a tapered shape, i.e., gradually increased in diameter toward the fluid supply and discharge tank 18 to form a part of the fluid supply and discharge tank 18 so as to set the capacity D of the first main fluid channel 6a substantially to zero. Moreover, it is also possible to positively reduce the temperature of the brake fluid in the cylinder 1 by transferring heat between the brake fluids in the cylinder 1 and the fluid supply and discharge tank 18 by way of a heat transferring device such as a heat pipe etc. slidably inserted into the first main fluid channel 6a leaving a gap therebetween. It is also a matter of course that the fluid supply and discharge tank 18 can be fixed to a nonrotating portion of a vehicle such as a back plate of a drum brake (a baffleplate in case of a disc brake). In case of a floating-caliper-type disc brake, however, since a caliper forming a cylinder moves accompanying the operating of the brakes, the first main fluid channel 6a should be made flexible when it is fixed to a nonrotating portion of a vehicle such as a baffleplate etc. other than the caliper.

As described above, it is a matter of course that not only the sixth embodiment but the first, second, fourth and fifth embodiments are also applicable to a disc brake. In case the brake element is a disc brake, the cylinder 1 is formed in a caliper as the cylinder 20. Moreover, the third embodiment is also applicable to a drum brake. In case the brake element is the drum brake, the cylinder 20 is attached to the back plate as the cylinder 1.

As understood from the above description, the method of and device for cooling a brake fluid according to the invention can obtain the following effects.

(1) Since the brake fluid capable of participating in the application of the brakes in the cylinder of a brake element, i.e., a drum brake or a disc brake can be increased and effectively cooled by air, it is possible to effectively prevent the brake fluid in the cylinder from being overheated without enlarging the cylinder of a brake element. As a result, almost all the conventional vapor-lock can be prevented with certainty without largely changing a design such as enlarging a brake element to eliminate brake operation failure, so that the brake element is improved in safety remarkably as well as in reliability by a comparatively simple structure.

(2) Since the cylinder itself is also prevented from being overheated by a decrease in temperature of the brake fluid in the cylinder of a brake element, a friction material forming brake shoes or pads is also restrained from rising in temperature. As a result, fade phenomenon that the coefficient of friction of a friction material is reduced accompanying the temperature rise thereof is also reduced so that a stable braking operation is obtained.

(3) Moreover, according to the sixth or fourteenth aspect of the invention, improving the cooling performance of the tank to further the temperature decrease of the brake fluid which flows out therefrom can effectively obtain the above effects. Furthermore, according to the seventh or fifteenth aspect of the invention, since the flexible first and second flow channels are prevented from abrasion, it is possible to improve the first and second flow channels in durability as well as to prevent accident caused by the leak of the brake fluid therefrom.

What is claimed is:

1. A device for cooling brake fluid in a cylinder of a brake element, comprising first and second flow channels wherein first ends of said first flow channel and second flow channel are connected to the cylinder of the brake element, and second ends of said first flow channel and second flow channel are connected to a fluid pressure generating unit which generates fluid pressure in accordance with a depressed amount of a brake pedal and at least one of said first and second flow channels is at least provided with means for generating a difference between an amount of brake fluid supplied to and an amount discharged from said cylinder to apply and release said brakes respectively through said first and second flow channels, wherein an absolute value of a difference between an amount of said brake fluid supplied to and an amount discharged from said cylinder in said first flow channel is made equal to an absolute value of a difference between an amount of said brake fluid supplied to and an amount discharged from said cylinder in said second flow channel so as to circulate said brake fluid in said cylinder using both of said first and second flow channels, and a pressure adjusting unit including a pump which is remote from the brake cylinder and disposed in one of said first and second flow channels, said pump circulating said brake fluid through said first and second flow channels and the cylinder during a braking operation so as to prevent overheating of said brake fluid.

2. A device for cooling a brake fluid according to claim, wherein a connecting member connects said first and second flow channels adjacent said first ends.

3. The device according to claim 2, wherein the connecting member is flexible and portions of said first and second flow channels adjacent said first ends are flexible so that vertical movement between a vehicle chassis and brake cylinder can occur.

4. The device for cooling brake fluid according to claim 2, wherein the connecting member extends axially along the first and second flow channels and has a plurality of openings therein for assisting in a cooling function.

5. The device for cooling brake fluid according to claim 2, wherein said connecting member includes first and second members connecting said first and second flow channels, said first and second members being spaced from each other in a radial direction relative to said first and second flow channels.

6. A device for cooling a brake fluid according to claim 1, wherein a tank is interposed in said first and second flow channels for storing said brake fluid which circulates in said first and second flow channels, said tank forming a part of said first and second channels.

7. A device for cooling a brake fluid according to claim 6, wherein said tank comprises a tank body which is divided inside into a plurality of liquid chambers by at least a partition having an opening portion, wherein adjacent liquid chambers communicate with one another by way of said opening portion, one of said liquid chambers located at one end of said tank body is connected to a hot side of one of said first and second flow channels while a liquid chamber located at the other end of said tank body is connected to a cool side of one of said first and second flow channels.

8. A device for cooling a brake fluid according to claim 6, characterized in that said means is attached to said tank.

9. The device for cooling brake fluid according to claim 1, wherein a plurality of connecting members connects said first and second flow channels adjacent respective said first ends thereof.

10. The device for cooling brake fluid according to claim 9, wherein a plurality of intervals between said plurality of connecting members increase in length away from said first ends of said first and second flow channels.

11. A device for cooling a brake fluid according to claim 4, wherein a main fluid channel is connected to the second ends of both of said first and second flow channels and extends to said fluid pressure generating unit.

12. A device for cooling a brake fluid according to claim 1, wherein said cylinder is a plural-pot type for a disc brake.

13. An anti-skid braking system including a device for cooling brake fluid, comprising:

a brake pedal movably connected to a vehicle;

a fluid pressure generation unit connected to said brake pedal and generating a fluid pressure in response to said brake pedal being depressed;

first and second brake fluid flow channels fluidly connected at first ends thereof to said fluid pressure generation unit;

a brake element fluidly connected to second ends of said first and second channels, said brake system having a brake release state with said fluid pressure generation unit not pressurizing brake fluid and said brake element not causing a braking action and a brake state with said fluid pressure generation unit flowing pressurized fluid into said first and second channels thereby activating said brake element to effect a braking action;

a flow restriction device in said first channel reducing the amount of brake fluid flowing from said brake element through said first channel and increasing the amount of brake fluid flowing through said second channel during transition from said brake state to said brake release state so that the brake fluid circulates through said brake system; and a pressurized fluid circulating device positioned in at least one of said first and second channels and during said brake state circulating brake fluid through said brake element and said first and second channels so as to prevent overheating of said brake fluid in said brake element.

14. The brake system according to claim 13, wherein a connecting member connects said first and second flow channels adjacent said second ends.

15. The brake system according to claim 14, wherein the connecting member is flexible and portions of said first and second flow channels adjacent said second ends are flexible so that vertical movement between a vehicle chassis and brake cylinder can occur.

16. The brake system according to claim 14, wherein the connecting member extends axially along the first and second flow channels and has a plurality of openings therein for assisting in a cooling function.

17. The brake system according to claim 14, wherein said connecting member includes first and second members connecting said first and second flow channels, said first and second members being spaced from each other in a radial direction relative to said first and second flow channels.

18. The brake system according to claim 13, wherein a tank is interposed in said first and second flow channels for storing said brake fluid which circulates in said first and second flow channels, said tank forming a part of said first and second channels.

19. The brake system according to claim 16, wherein said tank comprises a tank body which is divided inside into a plurality of liquid chambers by at least a partition having an opening portion, wherein adjacent liquid chambers communicate with one another by way of said opening portion, one of said liquid chambers located at one end of said tank body is connected to a hot fluid side of one of said first and second flow channels while another of said liquid chambers located at the other end of said tank body is connected to a cool fluid side of said one of said first and second flow channels.

20. The brake system according to claim 18, wherein said flow restriction device is attached to said tank.

21. The brake system according to claim 13, wherein a plurality of connecting members connects said first and second flow channels adjacent respective said second ends thereof.

22. The brake system according to claim 21, wherein a plurality of intervals between said plurality of connecting members increase in length away from said second ends of said first and second flow channels.

23. The brake system according to claim 13, wherein a main fluid channel is connected to the first ends of both of said first and second flow channels and extends to said fluid pressure generating unit.

24. The brake system according to claim 13, wherein said cylinder is a plural-pot type for a disc brake.

* * * * *

UNITED STATES PATENT AND TRADEMARK OFFICE
CERTIFICATE OF CORRECTION

PATENT NO : 6 041 898
DATED : March 28, 2000
INVENTOR(S) : Hiroyuki MAEDA It is certified that error appears in the above-identified patent and that said Letters Patent are hereby corrected as shown below:

Column 23; line 50,   after "claim" insert ---1---.

Column 24; line 27,   change "4" to ---1---.

Column 25; line 18,   change "16" to ---18---.

Signed and Sealed this

Tenth Day of April, 2001

*Attest:*

NICHOLAS P. GODICI

*Attesting Officer*    *Acting Director of the United States Patent and Trademark Office*